United States Patent [19]
Grocki

[11] Patent Number: 5,311,099
[45] Date of Patent: May 10, 1994

[54] PULSE DRIVER FOR CRT STRAY MAGNETIC FIELD CANCELLING CIRCUIT

[75] Inventor: Wayne D. Grocki, Libertyville, Ill.

[73] Assignee: Zenith Electronics Corporation, Glenview, Ill.

[21] Appl. No.: 998,092

[22] Filed: Dec. 28, 1992

[51] Int. Cl.$^5$ .............................................. H01J 29/06
[52] U.S. Cl. ........................................ 315/8; 315/364; 315/370; 315/408; 315/371
[58] Field of Search ............... 315/8, 364, 370, 408, 315/371

[56] References Cited
U.S. PATENT DOCUMENTS

| | | | |
|---|---|---|---|
| 4,510,527 | 4/1985 | den Hollander | 315/371 X |
| 4,584,503 | 4/1986 | Pan | 315/370 |
| 5,049,847 | 9/1991 | Okuyama et al. | 315/8 |
| 5,151,635 | 9/1992 | Cappels | 315/370 |

Primary Examiner—Robert J. Pascal
Assistant Examiner—Reginald H. Ratliff

[57] ABSTRACT

A CRT image display emanates an undesired stray magnetic field that originates in the horizontal deflection coil of a beam-deflecting yoke energized by pulses from a horizontal oscillator circuit. A novel drop-in auxiliary pulse generator substantially electrically independent of the CRT image display, and synchronized with the output of the horizontal oscillator circuit, provides for energizing systems or devices that can suppress the stray magnetic field. The auxiliary pulse generator relieves the CRT horizontal oscillator of the burden of energizing a system for suppressing the stray magnetic field.

14 Claims, 2 Drawing Sheets

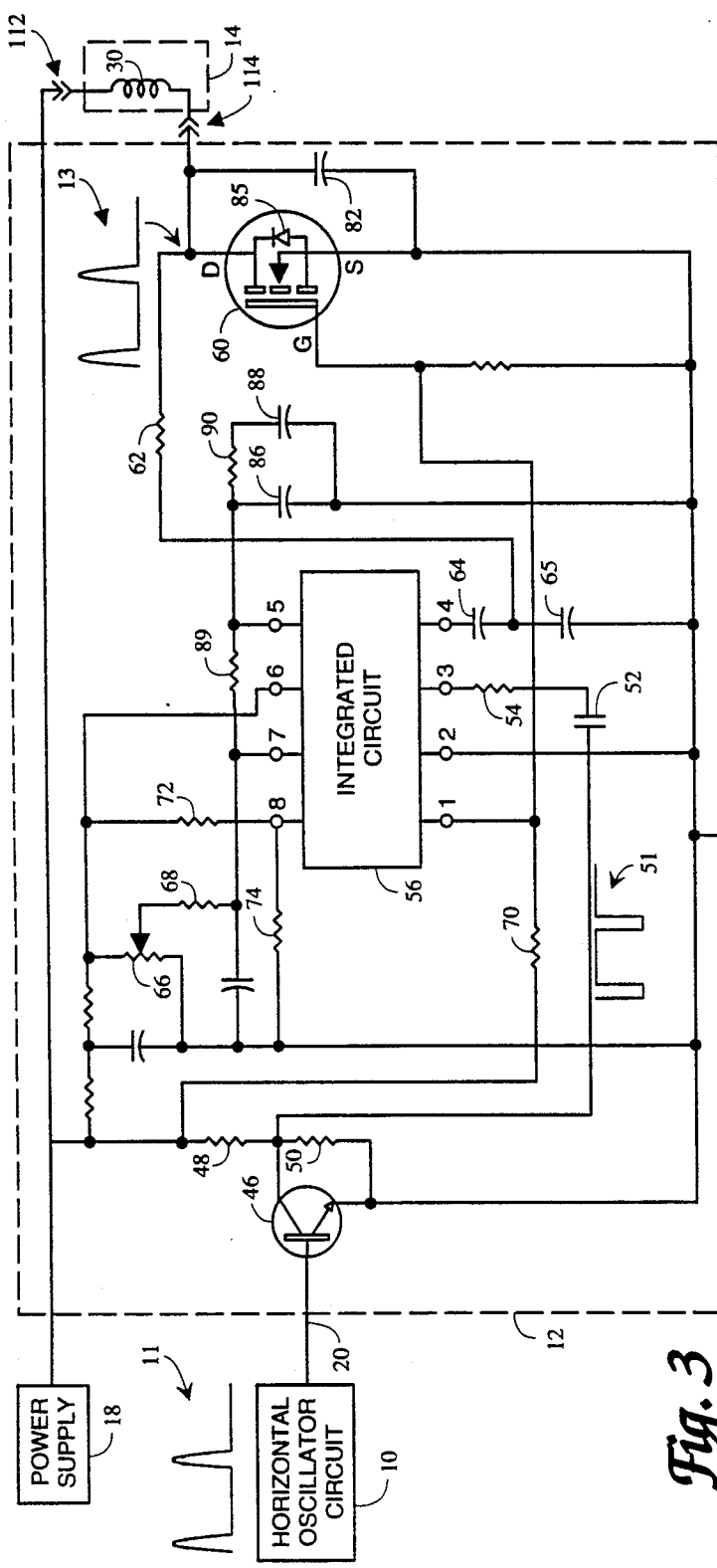

PULSE DRIVER FOR CRT STRAY MAGNETIC FIELD CANCELLING CIRCUIT

CROSS REFERENCE TO RELATED APPLICATIONS

This application is related to but in no way dependent on copending applications Ser. No. 814,125 filed Dec. 30, 1991, now U.S. Pat. No. 5,208,510; Ser. No. 868,922 filed Apr. 15, 1992 now U.S. Pat. No. 5,231,332; and Ser. No. 927,705 filed Aug. 10, 1992, all of common ownership herewith.

BACKGROUND OF THE INVENTION

1. Field of the Invention

This invention relates to cathode ray tube (CRT) imaging systems, and is addressed specifically to means for electrically energizing devices and systems designed to suppress or otherwise cancel stray magnetic fields emanating from such displays. The invention is applicable to monochrome and color CRT image displays used in monitors and television sets.

The present invention is in response to a concern over the possible detrimental effects of stray magnetic fields on the physiology of image display viewers. Testing for such fields in visual display terminals is described in a publication of the National Board for Measurement and Testing (MPR) of Sweden entitled "Test Methods for Visual Display Units: Visual Ergonomics and Emission Characteristics"; MPR 1990:8 1990-1991, Boras, Sweden. This standard is known as "MPR-2."

As is known, the primary source of stray magnetic fields in CRTs is the yoke. The yoke is an electromagnetic device that causes an electron beam (or "beams" in color CRTs) to scan a raster on the CRT viewing screen in both the horizontal and vertical directions. Essentially, a yoke consists of two pairs of coils, one of which deflects an electron beam in the horizontal direction, and the other in the vertical direction. The two pairs of coils appear as dual radiating magnetic dipoles. The respective deflection coils of the yoke are energized by a horizontal oscillator circuit and a vertical oscillator circuit. The horizontal oscillator circuit provides a train of sawtooth pulses having a frequency of 15,750 Hz in monochrome television sets, a frequency of 15,734.26 Hz in color television sets, and frequencies of up to 150 kHz in some visual display terminals. The pulses are routed to the electrical windings of the yoke that provide for the horizontal excursion of an electron beam across the imaging screen. A horizontal oscillator circuit typically emits a train of positive-going pulses having an amplitude of 400 to 1,000 volts. The pulses are integrated by the yoke circuit into a current having an amplitude in the range of three to twenty amperes for beam deflection.

Cost considerations require that horizontal oscillator circuits (and other circuits as well) be designed to meet the exact voltage and amperage requirements needed to drive the yoke, with no excess capacity. Hence the addition of stray magnetic field suppression devices that require substantial amounts of power has required a redesign of the horizontal oscillator circuits and in some cases, the power supplies, with consequent cost penalty.

In the context of this disclosure, the term "auxiliary" can be further defined as a "supplement"; that is, it supplements the role of a major circuit in a television system or monitor. In short, it is an adjunct that is not essential to the operation of the television set or monitor, but one that is used solely to energize a system for the suppression of the stray magnetic fields they generate. Essentially, the auxiliary pulse generator according to the invention is a substitute for the horizontal oscillator circuit, relieving the horizontal oscillator circuit from the need to energize a stray magnetic field suppression system. In consequence, the circuits of a CRT imaging system are not affected by the addition of such a system.

2. Discussion of Related Art

The present invention is concerned with means for energizing devices that provide for the suppression of the stray magnetic field that emanates from the horizontal deflection coil of the yoke. Such stray magnetic field suppression means include those disclosed in commonly owned referent copending applications Ser. No. 814,125 now U.S. Pat. No. 5,208,510 and Ser. No. 927,705. Essentially, stray magnetic fields are suppressed by interposing into the path of the stray field one or more electromagnetic devices that emit a radiation having a polarity opposite to that of the stray field, thus effectively cancelling the stray field.

Also, the means according to the present invention is effective in energizing the system for suppressing AC electric field emissions disclosed in referent copending application Ser. No. 868,922 now U.S. Pat. No. 5,231,332, also of common ownership.

OBJECTS OF THE INVENTION

Accordingly, it is among the objects of the invention to—

1. add the features of VLF magnetic field suppression per MPR-2 requirements to CRT image displays without the need to modify existing circuits;

2. provide means for energizing a stray magnetic field suppression device or system with the fewest possible electrical connections to the CRT image display circuits;

3. provide means for energizing a stray magnetic field suppression device or system that does not affect the operation or performance of the major circuits of a television system or monitor, such as the horizontal oscillator circuit, the yoke, or the power supply of the CRT image display;

4. provide a low-cost, stand-alone, drop-in pulse generator that functions as a component auxiliary to the major circuits cited in 3. above.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 3 is a detailed schematic diagram of the circuit of the auxiliary pulse generator according to the invention.

FIG. 4A is a diagram that depicts the development of a synchronized signal current waveform by the auxiliary pulse generator according to the invention; FIG. 4B is a depiction of the signal voltage that energizes a stray magnetic field suppression system.

DESCRIPTION OF THE PREFERRED EMBODIMENT

Figure 1:
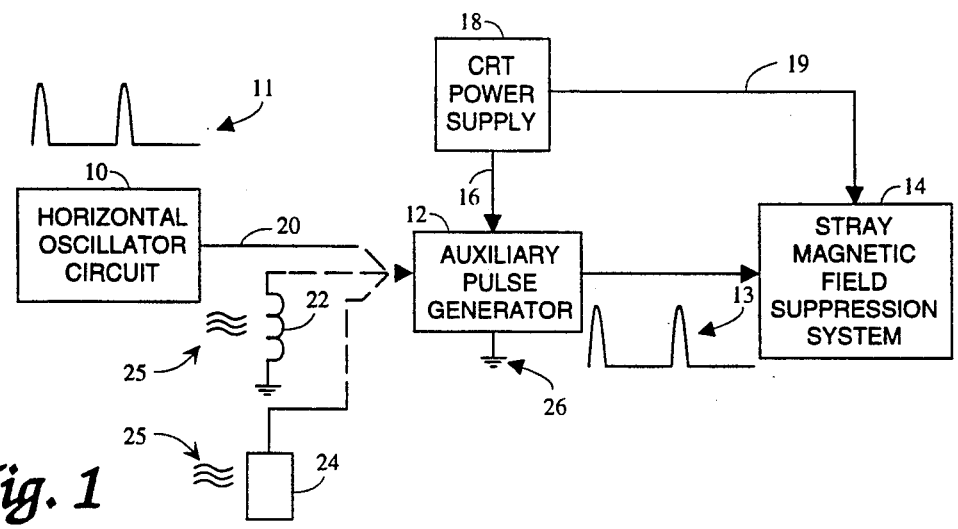
FIG. 1 is a simplified block diagram of an auxiliary pulse generator according to the invention, indicating its relationship with a horizontal oscillator circuit, a CRT power supply, and a stray magnetic field suppression system.

FIG. 1 is a block diagram of the auxiliary pulse generator according to the invention indicating its relationship with relevant components of a CRT image display. The horizontal oscillator circuit 10 of a CRT imaging display is indicated as generating a train of positive-going electrical pulses comprising what is hereafter termed a "sync signal." The sync signal 11 causes the yoke to move an electron beam or beams to move horizontally across the imaging screen of an associated cathode ray tube (not depicted).

Essentially, the auxiliary pulse generator 12 according to the invention comprises a self-contained, miniature, Class C energy-recovery system based on a novel circuit configuration, and with versatile means for interconnection with the horizontal oscillator circuit 10. The auxiliary pulse generator 12 is a stand-alone, drop-in device substantially electrically independent of the CRT image display circuits with which it is installed. The auxiliary pulse generator 12 needs only a connection to the CRT power supply 18 and, in one embodiment, a hardwired connection to the horizontal oscillator circuit 10 of the display. Its output is synchronized with the output of the horizontal oscillator for energizing a system or device that suppresses a stray magnetic field.

The stray magnetic field that emanates from the electron-beam-deflecting yoke is suppressed or otherwise negated by the intervention of a "time-coincident" magnetic field produced by the auxiliary pulse generator 12. The output of the auxiliary pulse generator 12 comprises a train of reference pulses 13 having a predetermined waveshape and amplitude, and with a polarity opposite to the polarity of the undesired stray magnetic field of the yoke.

It will be noted that the reference pulses 13 are positive-going. If pulses of negative polarity are required across the stray magnetic field suppression system 14, the polarity can be changed by a simple adjustment, as will be described.

The sync signal 11 may be routed from the horizontal oscillator circuit 10 to the auxiliary pulse generator 12 by a direct electrical connection 20. The connection 20 may be made to a suitable source of such pulses in the horizontal oscillator circuit, such as by a connection to a terminal that supplies the horizontal flyback signal, which is a source that provides the desirable properties of being short in duty cycle and with fast transition edge rates. Alternately, the output pulses of the horizontal oscillator circuit may be derived through coupling by means of an inductive pickup 22 which provides for inductive coupling to the magnetic component of the electromagnetic field 25 radiated by the horizontal oscillator circuit 10. A capacitive pick-up 24 may as well be used, which provides for capacitive coupling to the electric component of the electromagnetic field 25 radiated by the horizontal oscillator 10. The inductive pickup 22 or the capacitive pickup 24 are preferably placed at a convenient location close to the field of radiation field of a component of the horizontal oscillator circuit 10.

The auxiliary pulse generator 12 receives power for operation from a single connection 16 to the CRT power supply 18 which supplies 12 VDC, by way of example. The auxiliary pulse generator according to the invention requires relatively low power; as a result, no major modification of the circuits of the horizontal oscillator 10 or the CRT power supply 18 is necessary. The single connection 16 may be made at any convenient location in the power supply. The ground 26 is a connection to the common ground of the associated CRT image display circuit. Power supply 18 may also energize the stray magnetic field suppression system 14 by way of a conductor 19.

Figure 2:
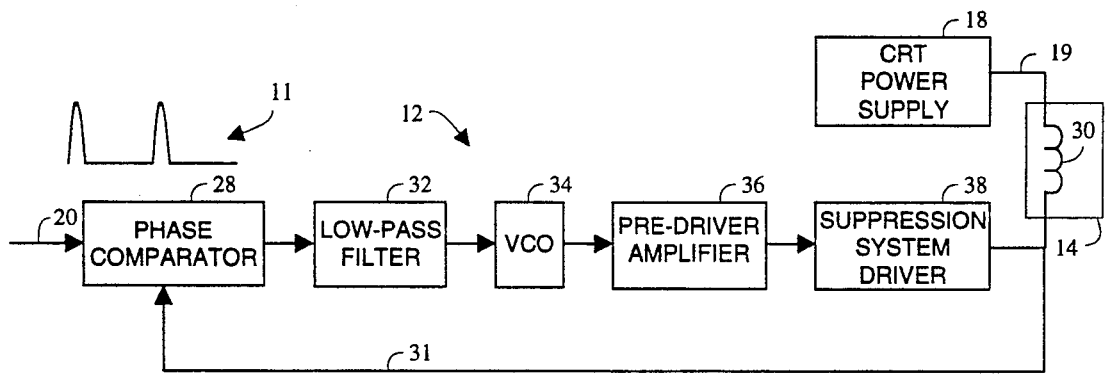
FIG. 2 is a block diagram depicting the major components of an auxiliary pulse generator according to the invention.

The major components of the auxiliary pulse generator 12 are indicated in the block diagram of FIG. 2. The operation of auxiliary pulse generator 12 is based on a phase-locked loop system consisting essentially of a phase comparator, a VCO (voltage controlled oscillator), and follow-on pulse-shaping and pulse-amplifying stages.

The phase comparator 28 receives the sync signal 11 from the horizontal oscillator circuit, shown as being by a direct electrical connection 20. The phase comparator 28 also receives a sample of the reference pulses 13 derived from the output signal that appears across an inductor 30 by way of a conductor 31. Inductor 30 is noted as being a simplified representation of the inductive nature of the stray magnetic field suppression systems and devices described and claimed in commonly owned referent copending applications Ser. Nos. 814,125, 868,922, and 927,705, which may be energized by the auxiliary pulse generator according to the invention.

The phase of the reference pulses 13 derived from inductor 30 is compared to the phase of the sync signal 11 by the phase comparator 28. Any variation in the frequency and phase of the pulses 13 from the frequency and phase of the pulses 11 from the horizontal oscillator circuit 10 is detected and corrected by the adjustment of the output of the VCO by the phase comparator, whose output signal is routed through a low-pass filter to the VCO 34. The output of the VCO 34 is amplified by a pre-driver stage 36 which in turn energizes a suppression system driver 38, the output of which energizes the stray magnetic field suppression system 14 represented by inductor 30.

A schematic diagram of the auxiliary pulse generator 12 according to the invention is depicted in FIG. 3. The sync signal 11 originating in the horizontal oscillator circuit 10 is routed to the base of NPN transistor 46 by way of connection 20. Transistor 46, connected as a common emitter, amplifies and "squares up" sync signal 11. The functions of transistor 46 will be further described in conjunction with the later descriptions of the inductive pick-up 22 and the capacitive pick-up 24.

The collector of transistor 46 receives voltage for operation from power supply 18 by its connection to the center tap of a voltage divider network consisting of resistor 48 and resistor 50. The amplified output of transistor 46, shown as being a train of negative-going, square-wave pulses 51, is routed from the collector of transistor 46 through capacitor 52 and resistor 54 to pin 3 of the integrated circuit IC 56.

The time-coincidence of the pulses of the auxiliary pulse generator 12 with the output of the horizontal oscillator circuit 10 is attained by means of a phase-locked loop incorporated in the IC 56, which incorporates (with the exception of the power supply 18) the components depicted in FIG. 2. As has been noted, the phase comparator 28 compares the phase of reference pulses and the sync signal 11, and adjusts the VCO to the exact frequency and phase of the sync signal 11. As a result, pulses time-related to the sync signal 11 of the horizontal oscillator circuit 10 are generated at pin 1 of the IC 56, which may comprise an MC1391P integrated circuit.

The pulses 13 derived from the stray magnetic field suppression system 14 that appear at the drain (D) of MOSFET transistor 60 are routed through resistor 62 and capacitor 64 to pin 4 of the IC 56 for phase comparison with the inverted sync pulses 51. The VCO component of the IC 56 is controlled by the phase comparator circuit to produce a pulse output that is precisely in sync with the sync pulses 11 of the horizontal oscillator circuit 10.

Resistor 62, in combination with capacitor 65, forms an electrical integration circuit that converts the reference pulses 13 to a sawtooth waveform acceptable to the IC 56.

The free-running frequency of the VCO component of the IC 56 is set to the approximate frequency of the sync signal 11 by adjustment of potentiometer 66, the center-tap of which is connected to pin 7 of the IC 56 through a resistor 68.

Pin 1 of the IC 56 receives 12 VDC voltage from the power supply 18 through the resistor 70 for operation of the IC 56. A bias voltage of two volts required by the IC 56 is supplied to pin 8 of the IC 56 by a resistive divider circuit consisting of resistor 72 and resistor 74.

The pre-drive component of the pre-driver amplifier 36 amplifies the output of the VCO, and the resulting signal is routed directly from pin 1 of the IC 56 to the gate (G) of transistor 60. Transistor 60 is an N-type channel, enhancement-mode, insulated-gate field effect transistor. A suitable transistor for this application is the Motorola MTP 15NOBL FET.

The pulses from the pre-driver 36, noted as being time-related to the sync signal 11 of the horizontal oscillator circuit 10, switch transistor 60 on and off to generate the current pulse waveform shown by FIG. 4A. When transistor 60 is switched on at time $t_0$, current 80 begins to flow in transistor 60, increasing in magnitude with time. This current also flows through the inductor 30 that represents the stray magnetic field suppression system 14. At time $t_1$, transistor 60 is switched off, and the current present in inductor 30 is redirected into capacitor 82, resulting in a rising voltage in capacitor 82. The rising voltage decreases the current in inductor 30. As the voltage of capacitor 82 increases to a peak, the current is reduced to zero at time $t_2$. The current in inductor 30 then reverses direction, driven from the peak of the pulse voltage 84 at time $t_1$ indicated by FIG. 4A. When the charge in capacitor 82 is depleted, the current in inductor 30 reaches a maximum at time $t_2$ as the pulse voltage 84 indicated in FIG. 4B drops to zero. As the reverse current of inductor 30 decreases, the voltage across capacitor 82 begins to rise towards a negative voltage. This voltage forward biases into conduction the parasitic diode 85 indicated as being a part of transistor 60.

The waveform depicted in FIG. 4A, which consists of the waveform segments described, will generate in the inductor 30 waveforms of appropriate timing and shape to suppress a stray magnetic field emanating from the yoke.

A low-pass filter circuit connected between pin 5 of the IC 56 and ground consists of capacitors 86 and 88 and resistor 90. This circuit removes the AC component from the phase detector output control signal. Resistor 89 provides for converting the output from voltage to current as current, not voltage, is used to control the VCO 34.

Figure 5:
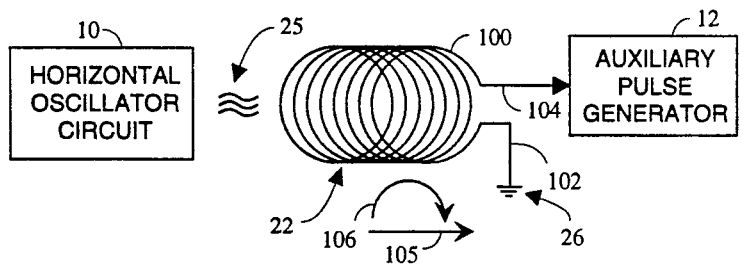
FIG. 5 is a schematic view of inductive means for the pick-up of sync signals from the electromagnetic field radiated by a horizontal oscillator circuit.

As indicated in FIG. 1, the sync pulses 11 of the horizontal oscillator circuit 10 may be coupled to the input of the auxiliary pulse generator by means of an inductive pick-up 22, which detects the electromagnetic field 25 of the horizontal oscillator circuit 10. As depicted schematically in FIG. 5, the inductive pick-up 22 may, by way of example, consist of a coil of eight or nine turns of insulated wire 100 wound to a diameter of about four inches, providing an inductance of about 5.6 mH. A first lead 102 of inductive pick-up 22 is connected to ground 26 and a second lead 104 is connected to the input of the auxiliary pulse generator 12, noted as being the base of transistor 46. Inductive pick-up 22 must be located close to a source of strong radiation in the horizontal oscillator circuit 10, such as adjacent to the flyback transformer. If the coil of wire 100 is rotated 180 degrees with respect to the direction of the path 105 of the magnetic component of the field of radiation 25, as indicated by arrow 106, the polarity of the sync signal 11 supplied to the auxiliary pulse generator 12 will be reversed; that is from positive to negative, or vice versa.

Figure 6:
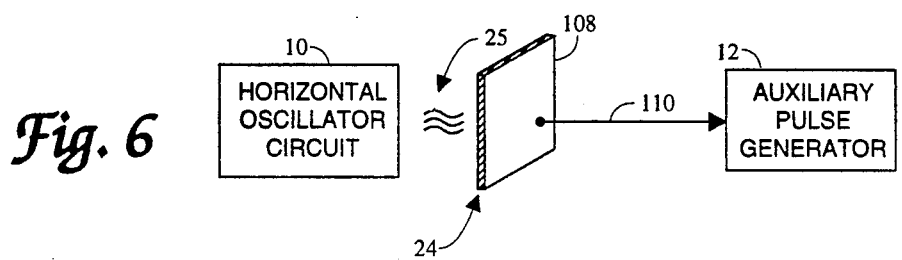
FIG. 6 is view similar to FIG. 5 depicting capacitive means for the pick-up of sync signals from the electromagnetic field radiated by a horizontal oscillator circuit.

As indicated in FIG. 1, a capacitive pick-up 24 may also be used to detect the electric component electromagnetic field 25 of the horizontal oscillator circuit 10. FIG. 6 depicts diagrammatically a capacitive pick-up consisting of a metal plate 108, the dimensions of which, for example, may be three inches by four inches, and with a thickness of 0.060 inch. A single electrical conductor 110 provides for connection to the input of the auxiliary pulse generator 12, noted as being the base of transistor 46. Plate 108 is made electrically non-conductive by insulation to prevent an electrical short if the plate 108 should accidentally contact an electrically charged component. Satisfactory pick-up of the sync signal 11 has been attained by placing the plate 108 close to a printed circuit board in the horizontal oscillator circuit 10 that holds the horizontal output transformer.

The capacitive probe 108 will respond to the dominant field of the radiation 25, which comprises the positive pulses of the sync signal 11 of the horizontal oscillator circuit 10. It is a characteristic of the IC 56, noted as being an MC1391P, that it will not accept positive pulses. Passage through transistor 46 provides the necessary conversion to negative-going pulses.

The pre-amplification function of transistor 46 is particularly important in its ability to amplify the relatively low-level signals provided by the inductive pick-up 22 and capacitive pick-up 24. As has been noted, and as indicated by waveform 51, transistor 46 also squares and steepens the pulse output, thus providing a cleaner pulse to input of the IC 56.

With regard to the polarity of the pulse output of the auxiliary pulse generator 12, if the stray magnetic field suppression system 14 requires a negative-going pulse for suppressing a stray magnetic field, or alternatively, a positive-going pulse, the connections 112 and 114 may be interchanged to provide output pulses having a polarity effective in suppressing a stray magnetic field.

The components of the auxiliary pulse generator according to the invention fit readily on a printed circuit board two inches square. The board can be mounted at any convenient location using, for example, a standard printed circuit board retainer that snaps into a hole in the chassis. A support of this type has a slot for holding one side of the board. The board is firmly fastened to the chassis by means of a machine screw.

What has been described is an easily installed auxiliary pulse generator for energizing various devices for suppressing or otherwise negating stray magnetic fields. It is recognized that numerous changes and modifications in the described embodiment of the invention will be apparent to those skilled in the art without departing from its true spirit and scope. The invention is to be limited only as defined in the claims.

I claim:

1. A drop-in auxiliary pulse generator for use in conjunction with a CRT imaging system that manifests an undesired stray magnetic field, the auxiliary pulse generator providing for producing collateral pulses that supplement the electron-beam-sweeping pulses of the CRT horizontal oscillator, and comprising:
   a) means for directly receiving or detecting the sweep pulses;
   b) means for generating collateral pulses having a frequency and phase approximating that of the electron-beam-sweeping pulses;
   c) means for exactly conforming the frequency and phase of the collateral pulses to the frequency and phase of the electron-beam-sweeping pulses;
   d) means for coupling the collateral pulses to a stray magnetic field suppression system;
   whereby the auxiliary pulse generator relieves the CRT horizontal oscillator of the burden of energizing a system for suppressing the stray magnetic field.

2. The auxiliary pulse generator defined by claim 1 further comprising means for changing the polarity of the collateral pulses routed to the stray magnetic field suppression system.

3. The auxiliary pulse generator defined by claim 1 further including an electrical connection from a source of the electron-beam-sweeping pulses in the horizontal oscillator directly to the auxiliary pulse generator.

4. The auxiliary pulse generator defined by claim 1 wherein the horizontal oscillator radiates an electromagnetic field, and the auxiliary pulse generator further includes an inductive coupler for detecting the magnetic component of the field and utilizing the electron-beam-sweeping pulses.

5. The auxiliary pulse generator defined by claim 1 wherein the horizontal oscillator radiates an electromagnetic field, and the auxiliary pulse generator further includes a capacitive coupler for detecting the electric component of the field and utilizing the electron-beam-sweeping pulses.

6. A drop-in auxiliary pulse generator for use in conjunction with a CRT imaging system that manifests an undesired stray magnetic field, the auxiliary pulse generator providing for producing collateral pulses that supplement the electron-beam-sweeping pulses of the CRT horizontal oscillator, and comprising:
   a) means for directly detecting or receiving the sweep pulses;
   b) means for generating collateral pulses having a frequency and phase approximating that of the electron-beam-sweeping pulses;
   c) means for exactly conforming the frequency and phase of the collateral pulses to the frequency and phase of the electron-beam-sweeping pulses, including:
      1) a phase comparator for comparing the frequency and phase of the collateral pulses with the frequency and phase of the electron-beam-sweeping pulses;
      2) a voltage controlled oscillator responsive to the phase comparator for regulating the frequency and phase of the collateral pulses; and
   d) means for coupling the collateral pulses to a stray magnetic field suppression system;
   whereby the auxiliary pulse generator relieves the CRT horizontal oscillator of the burden of energizing a system for suppressing the stray magnetic field.

7. The auxiliary pulse generator defined by claim 6 further including means for changing the polarity of the collateral pulses routed to the stray magnetic field suppression system.

8. The auxiliary pulse generator defined by claim 6 further including an electrical connection from a source of the electron-beam-sweeping pulses in the horizontal oscillator directly to the auxiliary pulse generator.

9. The auxiliary pulse generator defined by claim 6 wherein the horizontal oscillator radiates an electromagnetic field, and the auxiliary pulse generator further includes an inductive coupler for detecting the magnetic component of the field and utilizing the electron-beam-sweeping pulses.

10. The auxiliary pulse generator defined by claim 6 wherein the horizontal oscillator radiates an electromagnetic field, and the auxiliary pulse generator further includes a capacitive coupler for detecting the electric component of the field and utilizing the electron-beam-sweeping pulses.

11. A method of relieving the horizontal oscillator of a CRT imaging system of the burden of providing pulses for energizing a stray magnetic field suppression system, comprising:
   a) directly receiving or detecting pulses from the horizontal oscillator;
   b) generating collateral pulses of the same frequency and phase as the detected pulses with an independent auxiliary pulse generator not powered by the horizontal oscillator; and
   c) routing the collateral pulses to the stray magnetic field suppression system.

12. The method of claim 11 further including:
   a) directly electrically connecting the auxiliary pulse generator to a source of horizontal oscillator pulses.

13. The method of claim 11 further including:
   a) detecting the horizontal oscillator pulses by capacitive coupling to the electromagnetic field of the horizontal oscillator.

14. The method of claim 11 further including:
   a) detecting the horizontal oscillator pulses by inductive coupling to the electromagnetic field of the horizontal oscillator.

* * * * *